United States Patent
Mano et al.

(10) Patent No.: US 7,335,698 B2
(45) Date of Patent: Feb. 26, 2008

(54) FLUOROPOLYMER CONTAINING ETHYLENICALLY UNSATURATED GROUPS, AND CURABLE RESIN COMPOSITIONS AND ANTIREFLECTION COATINGS, MADE BY USING THE SAME

(75) Inventors: Hiroyuki Mano, Tokyo (JP); Hiroomi Shimomura, Tokyo (JP); Akira Nishikawa, Tokyo (JP)

(73) Assignee: JSR Corporation, Tokyo (JP)

( * ) Notice: Subject to any disclaimer, the term of this patent is extended or adjusted under 35 U.S.C. 154(b) by 392 days.

(21) Appl. No.: 10/498,347

(22) PCT Filed: Dec. 17, 2002

(86) PCT No.: PCT/JP02/13178

§ 371 (c)(1),
(2), (4) Date: Oct. 14, 2004

(87) PCT Pub. No.: WO03/054031

PCT Pub. Date: Jul. 3, 2003

(65) Prior Publication Data

US 2005/0038187 A1    Feb. 17, 2005

(30) Foreign Application Priority Data

Dec. 21, 2001   (JP) ............................. 2001-390328

(51) Int. Cl.
*C08K 3/00*   (2006.01)
(52) U.S. Cl. ...................... 524/589; 524/500; 525/101; 526/242; 528/30; 427/372.2
(58) Field of Classification Search ................ 524/589; 525/101; 526/242; 528/30; 427/372.2
See application file for complete search history.

(56) References Cited

U.S. PATENT DOCUMENTS 6,271,326 B1 * 8/2001 Nishikawa et al. ......... 526/242

FOREIGN PATENT DOCUMENTS

| EP | 0 425 436 A2 | | 5/1991 |
| EP | 425436 A2 | * | 5/1991 |
| EP | 953584 A1 | * | 4/1999 |
| EP | 0 953 584 A1 | | 11/1999 |
| EP | 953584 A1 | * | 11/1999 |
| JP | 57-034107 | | 2/1982 |
| JP | 59-189108 | | 10/1984 |
| JP | 60-067518 | | 4/1985 |
| JP | 5-279415 | | 10/1993 |
| JP | 6-35559 | | 5/1994 |
| JP | 6-199937 | | 7/1994 |
| JP | 07/113002 | * | 5/1995 |
| JP | 7-113002 | | 5/1995 |
| JP | 11-106457 | | 4/1999 |

(Continued)

*Primary Examiner*—David W. Wu
*Assistant Examiner*—Henry S. Hu
(74) *Attorney, Agent, or Firm*—Oblon, Spivak, McClelland, Maier & Neustadt, P.C.

(57) ABSTRACT

An ethylenically unsaturated group-containing fluoropolymer, which is obtained by reacting a compound containing one isocyanate group and at least one ethylenically unsaturated group, and a hydroxyl group-containing fluoropolymer at an isocyanate group/hydroxyl group molar ratio of 1.1 to 1.9. According to the present invention, an ethylenically unsaturated group-containing fluoropolymer having superior antiscratching property, coating property and durability, as well as a curable resin composition and an antireflection film using the same can be provided.

8 Claims, 1 Drawing Sheet

FOREIGN PATENT DOCUMENTS

| | | | |
|---|---|---|---|
| JP | 2001-247622 | | 9/2001 |
| JP | 2001-247622 A | * | 9/2001 |
| JP | 2001247622 | * | 9/2001 |
| WO | WO-03/054031 A1 | * | 7/2003 |

* cited by examiner

FLUOROPOLYMER CONTAINING ETHYLENICALLY UNSATURATED GROUPS, AND CURABLE RESIN COMPOSITIONS AND ANTIREFLECTION COATINGS, MADE BY USING THE SAME

TECHNICAL FIELD

The present invention relates to an ethylenically unsaturated group-containing fluoropolymer, as well as a curable resin composition and an antireflection film using the same. More precisely, the present invention relates to an ethylenically unsaturated group-containing fluoropolymer, as well as a curable resin composition which contains the ethylenically unsaturated group-containing fluoropolymer and can provide a cured product exhibiting superior antiscratching property, coating property and durability when it is cured, and an antireflection film having a low refractive index layer comprising such a cured product.

BACKGROUND ART

To prevent reflection of outside lights and improve image quality of various display panels such as liquid crystal display panels, cold cathode ray tube panels and plasma displays, being desired is an antireflection film having a low refractive index layer comprising a cured product exhibiting a superior low refractive index property, antiscratching property, coating property and durability.

Surfaces of these display panels are often wiped with gauze impregnated with ethanol or the like to remove adhered fingerprints, dusts etc., and therefore antiscratching property is desired.

In liquid crystal display panels, in particular, an antireflection film is provided on a liquid crystal unit in a state that it is laminated on a polarizing plate. Further, for example, triacetyl cellulose etc. is used as a substrate. An antireflection film using such a substrate usually need to be saponified with an alkaline aqueous solution to increase adhesion when it is adhered to the polarizing plate.

Accordingly, for use in liquid crystal display panels, an antireflection film exhibiting superior durability, especially superior alkali resistance, is desired.

As materials for a low refractive index layer of antireflection films, for example, fluorine resin type paints containing a hydroxyl group-containing fluoropolymer are known, and they are disclosed in JP-A-57-34107, JP-A-59-189108, JP-A-60-67518 and so forth.

However, for such fluorine resin type paints, it is necessary to heat the hydroxyl group-containing fluoropolymer and a curing agent such as a melamine resin in the presence of an acidic catalyst to crosslink them for curing a coated film. Therefore, such fluorine resin type paints have problems depending on the heating conditions that curing time is extremely extended or types of usable substrates are limited.

Furthermore, the obtained coated film also has problems of poor antiscratching property and durability, although it exhibits superior weather resistance.

Therefore, to solve the above problems, JP-B-6-35559 proposes a paint composition containing an unsaturated group- and fluorine-containing vinyl polymer obtained by reacting an isocyanate group-containing unsaturated compound having at least one isocyanate group and at least one addition-polymerizable unsaturated group and a hydroxyl group-containing fluoropolymer at an isocyanate group/hydroxyl group number ratio of 0.01 to 1.0.

However, in the aforementioned patent publication, the unsaturated group- and fluorine-containing vinyl polymer is prepared without using the isocyanate group-containing unsaturated compound in an amount sufficient for reacting all of the hydroxyl groups in the hydroxyl group-containing fluoropolymer so as to intentionally leave unreacted hydroxyl groups in the polymer.

Therefore, although a paint composition containing such a polymer can be cured at a low temperature in a short period of time, a curing agent such as a melamine resin must be further used to react the remaining hydroxyl groups for curing. Further, the coated film obtained in the aforementioned patent publication has a problem that coating property and antiscratching property cannot be considered sufficient.

Accordingly, an object of the present invention is to provide an ethylenically unsaturated group-containing fluoropolymer which exhibits superior antiscratching property, coating property and durability, a curable resin composition and an antireflection film using the same.

DISCLOSURE OF THE INVENTION

According to the present invention, there is provided an ethylenically unsaturated group-containing fluoropolymer obtained by reacting a compound containing one isocyanate group and at least one ethylenically unsaturated group and a hydroxyl group-containing fluoropolymer at an isocyanate group/hydroxyl group molar ratio of 1.1 to 1.9.

By reacting them at such a molar ratio, an ethylenically unsaturated group-containing fluoropolymer in which all of hydroxyl groups are reacted with isocyanate groups can be obtained. As a result, antiscratching property such as gauze abrasion resistance and durability such as alkali resistance are improved.

Further, in the ethylenically unsaturated group-containing fluoropolymer of the present invention, the aforementioned hydroxyl group-containing fluoropolymer preferably contains 20 to 70% by mole of the following structural unit (a), 10 to 70% by mole of the following structural unit (b) and 5 to 70% by mole of the following structural unit (c) and has a number average molecular weight of 5,000 to 500,000 in terms of polystyrene as measured by gel permeation chromatography.

(a) Structural unit represented by the following general formula (1)
(b) Structural unit represented by the following general formula (2)
(c) Structural unit represented by the following general formula (3)

With such a configuration, a coated film exhibiting superior low refractive index property, antiscratching property, coating property and durability can be obtained.

In the general formula (1), $R^1$ represents a fluorine atom, fluoroalkyl group or group represented as $-OR^2$ ($R^2$ represents an alkyl group or fluoroalkyl group).

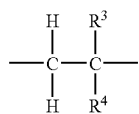

(2)

In the general formula (2), $R^3$ represents a hydrogen atom or methyl group, $R^4$ represents an alkyl group, group represented as $-(CH_2)_x-OR^5$ or $-OCOR^5$ ($R^5$ represents an alkyl group or glycidyl group, and x represents a number of 0 or 1), carboxyl group or alkoxycarbonyl group.

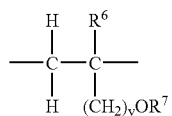

(3)

In the general formula (3), $R^6$ represents a hydrogen atom or methyl group, $R^7$ represents a hydrogen atom or hydroxyalkyl group, and v represents a number of 0 or 1.

Further, in the ethylenically unsaturated group-containing fluoropolymer of the present invention, the aforementioned hydroxyl group-containing fluoropolymer preferably further contains 0.1 to 10% by mole of the following structural unit (d) derived from an azo group-containing polysiloxane compound.

(d) Structural unit represented by the following general formula (4)

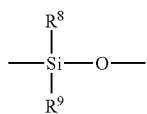

(4)

In the general formula (4), $R^8$ and $R^9$ may be identical or different and represent a hydrogen atom, alkyl group, halogenated alkyl group or aryl group.

If the structural unit (d) is contained, antiscratching property is improved.

Further, the ethylenically unsaturated group-containing fluoropolymer of the present invention preferably contains the aforementioned structural unit (d) as a part of the following structural unit (e).

(e) Structural unit represented by the following general formula (5)

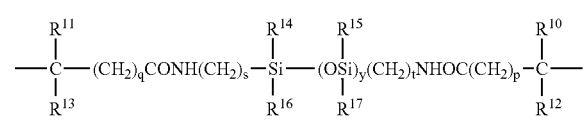

(5)

In the general formula (5), $R^{10}$ to $R^{13}$ represent a hydrogen atom, alkyl group or cyano group, $R^{14}$ to $R^{17}$ represent a hydrogen atom or alkyl group, p and q represent a number of 1 to 6, s and t represent a number of 0 to 6, and y represents a number of 1 to 200].

Further, in the ethylenically unsaturated group-containing fluoropolymer of the present invention, the aforementioned hydroxyl group-containing fluoropolymer preferably further contains 0.1 to 5% by mole of the following structural unit (f).

(f) Structural unit represented by the following general formula (6)

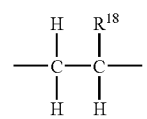

(6)

In the general formula (6), $R^{18}$ represents a group having emulsifying action.

If the structural unit (f) is contained, coating property is improved.

Further, in the ethylenically unsaturated group-containing fluoropolymer of the present invention, the ethylenically unsaturated group in the aforementioned compound containing one isocyanate group and at least one ethylenically unsaturated group is preferably (meth)acryloyl group.

If the ethylenically unsaturated group is (meth)acryloyl group, the ethylenically unsaturated group-containing fluoropolymer can be polymerized by a polymerization reaction caused by radicals generated by ultraviolet ray irradiation or heating to cure a coated film.

Further, in the ethylenically unsaturated group-containing fluoropolymer of the present invention, the aforementioned compound containing one isocyanate group and at least one ethylenically unsaturated group is preferably 2-(meth)acryloyloxyethyl isocyanate.

If 2-(meth)acryloyloxyethyl isocyanate is used, an ethylenically unsaturated group can be introduced while maintaining a low refractive index.

Another embodiment of the present invention is a curable resin composition containing the aforementioned ethylenically unsaturated group-containing fluoropolymer, a polyfunctional (meth)acrylate compound containing at least two (meth)acryloyl groups and/or a fluorine-containing (meth) acrylate compound containing at least one (meth)acryloyl group.

With such a curable resin composition, a cured product which exhibits superior antiscratching property, coating property and durability can be obtained.

Further, the curable resin composition of the present invention preferably further contains a compound that generates active species by irradiation of an active energy ray or heating.

If such a compound that generates active species is contained, the composition can be appropriately cured.

Further, another embodiment of the present invention is an antireflection film containing a low refractive index layer comprising a cured product obtained by curing the aforementioned curable resin composition.

If such a low refractive index layer is contained, an antireflection film which exhibits superior antiscratching property, coating property and durability can be obtained.

BEST MODE FOR CARRYING OUT THE INVENTION

Figure 1:
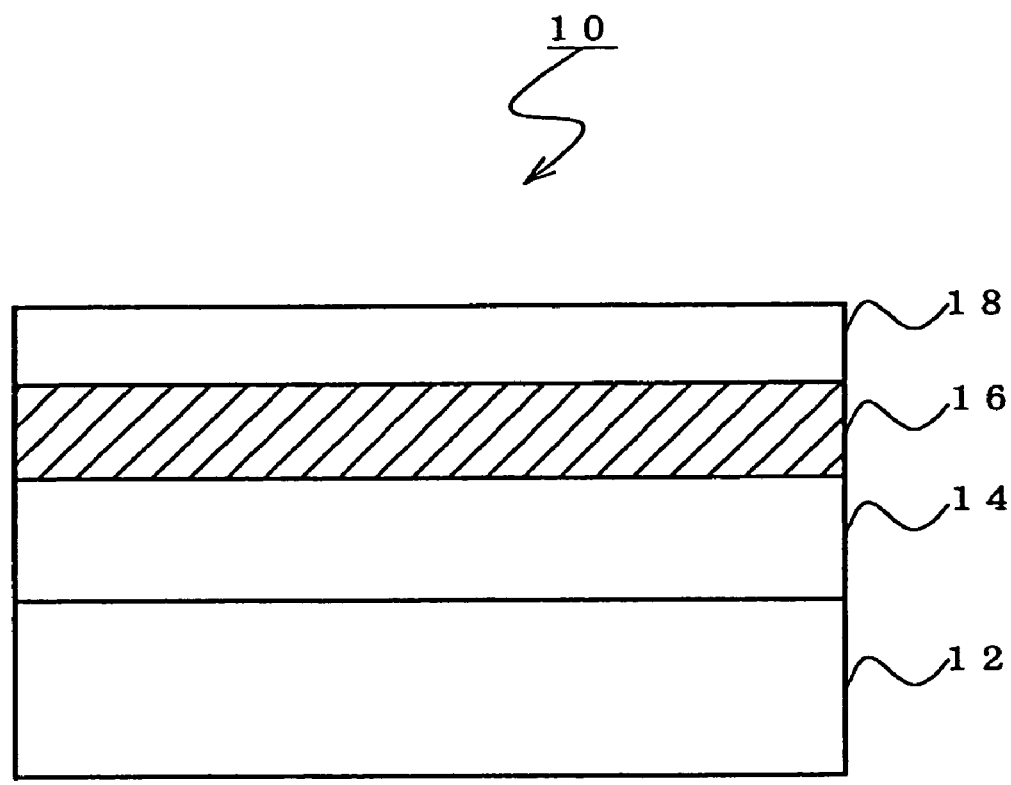
FIG. 1 shows a cross sectional view of an antireflection film according to one embodiment of the present invention.

Hereafter, embodiments of the ethylenically unsaturated group-containing fluoropolymer, curable resin composition and antireflection film of the present invention will be explained.

1. Ethylenically Unsaturated Group-containing Fluoropolymer

The ethylenically unsaturated group-containing fluoropolymer of the present invention can be obtained by reacting a compound containing one isocyanate group and at least one ethylenically unsaturated group and a hydroxyl group-containing fluoropolymer at an isocyanate group/hydroxyl group molar ratio of 1.1 to 1.9.

(1) Compound Containing One Isocyanate Group and at Least One Ethylenically Unsaturated Group The compound containing one isocyanate group and at least one ethylenically unsaturated group is not particularly limited so long as it is a compound that contains one isocyanate group and at least one ethylenically unsaturated group in the molecule.

If two or more isocyanate groups are contained, gelation may occur at the time of the reaction with the hydroxyl group-containing fluoropolymer.

Further, a compound having (meth)acryloyl group as the aforementioned ethylenically unsaturated group is more preferred because such a compound makes it easier to cure the curable resin composition explained later.

Examples of such a compound include a single kind of compound or combinations of two or more kinds of compounds selected from 2-(meth)acryloyloxyethyl isocyanate, 2-(meth)acryloyloxypropyl isocyanate.

Such compounds can also be synthesized by reacting a diisocyanate with a hydroxyl group-containing (meth)acrylate.

In this case, examples of the diisocyanate include a single kind of compound or combinations of two or more kinds of compounds selected from 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylene bis(4-cyclohexyl isocyanate), 2,2,4-trimethylhexamethylene diisocyanate, bis(2-isocyanatoethyl)fumarate, 6-isopropyl-1,3-phenyl diisocyanate, 4-diphenylpropane diisocyanate, lysine diisocyanate, hydrogenated diphenylmethane diisocyanate, 1,3-bis(isocyanatomethyl)cyclohexane, tetramethylxylylene diisocyanate, 2,5(or 6)-bis(isocyanatomethyl)-bicyclo[2.2.1]heptane and so forth.

Among these, 2,4-tolylene diisocyanate, isophorone diisocyanate, xylylene diisocyanate, methylene bis(4-cyclohexyl isocyanate) and 1,3-bis(isocyanatomethyl)cyclohexane are particularly preferred.

Examples of the hydroxyl group-containing (meth)acrylate include a single kind of compound or combinations of two or more kinds of compounds selected from 2-hydroxyethyl (meth)acrylate, 2-hydroxybutyl (meth)acrylate, 2-hydroxypropyl (meth)acrylate, caprolactone (meth)acrylate, polypropylene glycol (meth)acrylate, dipentaerythritol penta(meth)acrylate, pentaerythritol tri(meth)acrylate, pentaerythritol di(meth)acrylate monostearate, isocyanuric acid EO-modified di(meth)acrylate and so forth.

Among these, 2-hydroxyethyl (meth)acrylate and pentaerythritol tri(meth)acrylate are particularly preferred.

Examples of commercially available products of hydroxyl group-containing polyfunctional (meth)acrylate include HEA (trade name, produced by Osaka Organic Chemical Industry Ltd.), KAYARAD DPHA and PET-30 (trade names, produced by Nippon Kayaku Co., Ltd.), ARONIX M-215, M-233, M-305 and M-400 (trade names, produced by Toagosei Co., Ltd.) and so forth.

When the ethylenically unsaturated group-containing fluoropolymer is synthesized from a diisocyanate and a hydroxyl group-containing polyfunctional (meth)acrylate, the amount of the hydroxyl group-containing polyfunctional (meth)acrylate is preferably 1 to 1.2 moles per 1 mole of the diisocyanate.

Examples of the method for synthesizing such a compound include a method of charging whole amounts of the diisocyanate and the hydroxyl group-containing (meth)acrylate to perform the reaction, a method of adding the diisocyanate dropwise to the hydroxyl group-containing (meth)acrylate to perform the reaction and so forth.

(2) Hydroxyl Group-Containing Fluoropolymer

① Structural Unit (a)

In the aforementioned general formula (1), examples of the fluoroalkyl group as $R^1$ and $R^2$ include fluoroalkyl groups containing 1 to 6 carbon atoms such as trifluoromethyl group, perfluoroethyl group, perfluoropropyl group, perfluorobutyl group, perfluorohexyl group and perfluorocyclohexyl group. Further, examples of the alkyl group as $R^2$ include alkyl groups containing 1 to 6 carbon atoms such as methyl group, ethyl group, propyl group, butyl group, hexyl group and cyclohexyl group.

The structural unit (a) can be introduced by using a fluorine-containing vinyl monomer as a polymerization component. Such a fluorine-containing vinyl monomer is not particularly limited so long as it is a compound having at least one polymerizable unsaturated double bond and at least one fluorine atom. Examples thereof include a single kind of compound or combinations of two or more kinds of compounds selected from fluoroolefins such as tetrafluoroethylene, hexafluoropropylene and 3,3,3-trifluoropropylene; alkyl perfluorovinyl ethers or alkoxyalkyl perfluorovinyl ethers; perfluoro(alkyl vinyl ethers) such as perfluoro(methyl vinyl ether), perfluoro(ethyl vinyl ether), perfluoro(propyl vinyl ether), perfluoro(butyl vinyl ether) and perfluoro(isobutyl vinyl ether); and perfluoro(alkoxyalkyl vinyl ethers) such as perfluoro(propoxypropyl vinyl ether).

Among these, hexafluoropropylene and perfluoro(alkyl vinyl ether) or perfluoro(alkoxyalkyl vinyl ether) are more preferred, and combinations of these are still more preferred.

The content of the structural unit (a) is 20 to 70% by mole based on the total amount of the hydroxyl group-containing fluoropolymer which is taken as 100% by mole. This is because if the content is lower than 20% by mole, it may become difficult to obtain a low refractive index property, which is an optical characteristic of a fluorine-containing material intended by the present invention, whereas if the content exceeds 70% by mole, solubility in an organic solvent, transparency or adhesion to a substrate of the hydroxyl group-containing fluoropolymer may be degraded.

Further, for the aforementioned reasons, the content of the structural unit (a) is preferably 25 to 65% by mole, more preferably 30 to 60% by mole, based on the total amount of the hydroxyl group-containing fluoropolymer.

② Structural Unit (b)

In the general formula (2), examples of the alkyl group as $R^4$ or $R^5$ include alkyl groups containing 1 to 12 carbon atoms such as methyl group, ethyl group, propyl group, hexyl group, cyclohexyl group and lauryl group, and examples of the alkoxycarbonyl group include methoxycarbonyl group, ethoxycarbonyl group and so forth.

The structural unit (b) can be introduced by using a vinyl monomer having the aforementioned substituents as a polymerization component. Examples of such a vinyl monomer include a single kind of compound or combinations of two or more kinds of compounds selected from alkyl vinyl ethers or cycloalkyl vinyl ethers such as methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, 2-ethylhexyl vinyl ether and cyclohexyl vinyl ether; allyl ethers such as ethyl allyl ether and butyl allyl ether; carboxylic acid vinyl esters such as vinyl acetate, vinyl propionate, vinyl butyrate, vinyl pivalate, vinyl caproate, vinyl versate and vinyl stearate; (meth) acrylic acid esters such as methyl(meth)acrylate, ethyl (meth)acrylate, n-butyl(meth)acrylate, isobutyl(meth) acrylate, 2-methoxyethyl(meth)acrylate, 2-ethoxyethyl (meth)acrylate and 2-(n-propoxy)ethyl(meth)acrylate; unsaturated carboxylic acids such as (meth)acrylic acid, crotonic acid, maleic acid, fumaric acid and itaconic acid and so forth.

The content of the structural unit (b) is 10 to 70% by mole based on the total amount of the hydroxyl group-containing fluoropolymer which is taken as 100% by mole. This is because if the content is lower than 10% by mole, solubility of the hydroxyl group-containing fluoropolymer in an organic solvent may be degraded, whereas if the content exceeds 70% by mole, optical characteristics such as transparency and low reflectance property of the hydroxyl group-containing fluoropolymer may be degraded.

Further, for the aforementioned reasons, the content of the structural unit (b) is preferably 20 to 60% by mole, more preferably 30 to 60% by mole, based on the total amount of the hydroxyl group-containing fluoropolymer.

③ Structural Unit (c)

In the general formula (3), examples of the hydroxyalkyl group as $R^7$ include 2-hydroxyethyl group, 2-hydroxypropyl group, 3-hydroxypropyl group, 4-hydroxybutyl group, 3-hydroxybutyl group, 5-hydroxypentyl group and 6-hydroxyhexyl group.

The structural unit (c) can be introduced by using a hydroxyl group-containing vinyl monomer as a polymerization component. Examples of such a hydroxyl group-containing vinyl monomer include hydroxyl group-containing vinyl ethers such as 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 5-hydroxypentyl vinyl ether and 6-hydroxyhexyl vinyl ether, hydroxyl group-containing allyl ethers such as 2-hydroxyethyl allyl ether, 4-hydroxybutyl allyl ether and glycerol monoallyl ether, allyl alcohol and so forth.

Further, as the hydroxyl group-containing vinyl monomer, in addition to those mentioned above, 2-hydroxyethyl(meth) acrylate, 2-hydroxybutyl(meth)acrylate, 2-hydroxypropyl (meth)acrylate, caprolactone(meth)acrylate, polypropylene glycol(meth)acrylate and so forth can be used.

The content of the structural unit (c) is preferably 5 to 70% by mole based on the total amount of the hydroxyl group-containing fluoropolymer which is taken as 100% by mole. This is because if the content is lower than 5% by mole, solubility of the hydroxyl group-containing fluoropolymer in an organic solvent may be degraded, whereas if the content exceeds 70% by mole, optical characteristics of the hydroxyl group-containing fluoropolymer such as transparency or low reflectance property may be degraded.

Further, for the aforementioned reasons, the content of the structural unit (c) is more preferably 5 to 40% by mole, still more preferably 5 to 30% by mole, based on the total amount of the hydroxyl group-containing fluoropolymer.

④ Structural Unit (d) and Structural Unit (e)

Further, it is also preferred that the hydroxyl group-containing fluoropolymer further contains the aforementioned structural unit (d). Hereafter, the structural unit (d) will be explained.

In the general formula (4), examples of the alkyl group as $R^8$ or $R^9$ include alkyl groups containing 1 to 3 carbon atoms such as methyl group, ethyl group and propyl group, examples of the halogenated alkyl group include fluoroalkyl groups containing 1 to 4 carbon atoms such as trifluoromethyl group, perfluoroethyl group, perfluoropropyl group and perfluorobutyl group, and examples of the aryl group include phenyl group, benzyl group and naphthyl group.

The structural unit (d) can be introduced by using an azo group-containing polysiloxane compound having a polysiloxane segment represented by the general formula (4). Examples of such an azo group-containing polysiloxane compound include compounds represented by the following general formula (7).

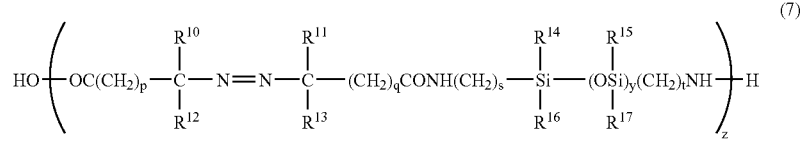

(7)

$$HO + OC(CH_2)_p - \underset{R^{12}}{\overset{R^{10}}{\underset{|}{C}}} - N=N - \underset{R^{13}}{\overset{R^{11}}{\underset{|}{C}}} - (CH_2)_q CONH(CH_2)_s - \underset{R^{16}}{\overset{R^{14}}{\underset{|}{Si}}} - (OSi)_y(CH_2)_t NH +_z H$$

In the general formula (7), $R^{10}$ to $R^{13}$, $R^{14}$ to $R^{17}$, p, q, s, t and y have the same meanings as defined in the aforementioned general formula (5), and z represents a number of 1 to 20.

If a compound represented by the general formula (7) is used, the structural unit (d) shall be contained in the hydroxyl group-containing fluoropolymer as a part of the structural unit (e). In this case, in the general formula (5), examples of the alkyl groups as $R^{10}$ to $R^{13}$ include alkyl groups containing 1 to 12 carbon atoms such as methyl group, ethyl group, propyl group, hexyl group and cyclohexyl group, and examples of the alkyl groups as $R^{14}$ to $R^{17}$ include alkyl groups containing 1 to 3 carbon atoms such as methyl group, ethyl group and propyl group.

In the present invention, the azo group-containing polysiloxane compound represented by the aforementioned general formula (7) is particularly preferably a compound represented by the following general formula (8).

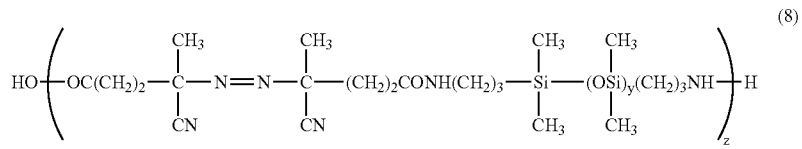

(8)

In the general formula (8), y and z have the same meanings as defined in the general formula (7).

The content of the structural unit (d) is preferably 0.1 to 10% by mole based on the total amount of the hydroxyl group-containing fluoropolymer which is taken as 100% by mole. This is because if the content is lower than 0.1% by mole, surface lubricity of a cured coated film may be degraded, which may result in degradation of the antiscratching property of the coated film, whereas if the content exceeds 10% by mole, transparency of the hydroxyl group-containing fluoropolymer may be degraded, and repellency or the like may become likely to occur upon application when it is used as a coating material.

Further, for the aforementioned reasons, the content of the structural unit (d) is more preferably 0.1 to 5% by mole, still more preferably 0.1 to 3% by mole, based on the total amount of the hydroxyl group-containing fluoropolymer. For the same reasons, the content of the structural unit (e) is preferably determined so that the content of the structural unit (d) contained therein should be within the aforementioned range.

⑤ Structural Unit (f)

Further, it is also preferred that the hydroxyl group-containing fluoropolymer further contains the aforementioned structural unit (f). Hereafter, the structural unit (f) will be explained.

In the general formula (6), the group having emulsifying action as $R^{18}$ is preferably a group which has both of a hydrophobic group and a hydrophilic group, and in which the hydrophilic group has a structure of polyether such as polyethylene oxide and polypropylene oxide.

Examples of such a group having emulsifying action include groups represented by the following general formula (9).

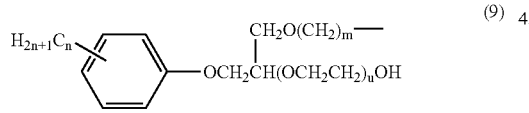

(9)

In the general formula (9), n represents a number of 1 to 20, m represents a number of 0 to 4, and u represents a number of 3 to 50.

The structural unit (f) can be introduced by using a reactive emulsifier as a polymerization component. Examples of such a reactive emulsifier include compounds represented by the following general formula (10).

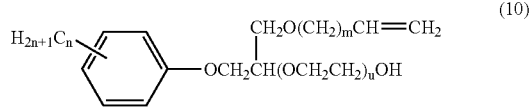

(10)

In the general formula (10), n, m and u have the same meanings as defined in the aforementioned general formula (9).

The content of the structural unit (f) is preferably 0.1 to 5% by mole based on the total amount of the hydroxyl group-containing fluoropolymer which is taken as 100% by mole. This is because if the content is 0.1% by mole or higher, solubility of the hydroxyl group-containing fluoropolymer in a solvent is improved, and if the content is 5% by mole of or lower, adhesion of the curable resin composition does not unduly increase, which results in easy handling, and moisture resistance is not degraded even in use as a coating material or the like.

Further, for the aforementioned reasons, the content of the structural unit (f) is more preferably 0.1 to 3% by mole, still more preferably 0.2 to 3% by mole, based on the total amount of the hydroxyl group-containing fluoropolymer.

⑥ Molecular Weight

The number average molecular weight of the hydroxyl group-containing fluoropolymer in terms of polystyrene is preferably 5000 to 500,000 as measured by gel permeation chromatography (hereinafter referred to as "GPC") using tetrahydrofuran (hereinafter referred to as "THF") as a solvent. This is because if the number average molecular weight is less than 5000, mechanical strength of the hydroxyl group-containing fluoropolymer may be degraded, whereas if the number average molecular weight exceeds 500,000, viscosity of the curable resin composition explained later may increase, and thus it may become difficult to coat a thin film.

Further, for the aforementioned reasons, the number average molecular weight of the hydroxyl group-containing fluoropolymer in terms of polystyrene is more preferably 10,000 to 300,000, still more preferably 10,000 to 100,000.

(3) Molar Ratio for Reaction

The ethylenically unsaturated group-containing fluoropolymer of the present invention is obtained by reacting the aforementioned compound containing one isocyanate group and at least one ethylenically unsaturated group with the hydroxyl group-containing fluoropolymer at an isocyanate group/hydroxyl group molar ratio of 1.1 to 1.9. This is because if the molar ratio is lower than 1.1, antiscratching property and durability may be degraded, whereas if the molar ratio exceeds 1.9, antiscratching property of a coated film of a curable resin composition may be degraded after immersion in an alkaline aqueous solution.

Further, for the aforementioned reasons, the isocyanate group/hydroxyl group molar ratio is preferably 1.1 to 1.5, more preferably 1.2 to 1.5.

2. Curable Resin Composition

The curable resin composition of the present invention contains the following components (a) to (c). Among these components, the component (a) is an essential component, and the component (b) and the component (c) are preferably contained.

(a) Ethylenically unsaturated group-containing fluoropolymer mentioned above (b) Polyfunctional (meth)acrylate compound containing at least two (meth)acryloyl groups and/or a fluorine-containing (meth)acrylate compound containing at least one (meth)acryloyl group (c) Compound generating an active species by irradiation of an active energy ray or heating The addition amount of the component (a) is not particularly limited, and it is usually 3 to 95% by weight. This is because if the addition amount is less than 3% by weight, refractive index of a cured coated film of the curable resin composition may increase, and thus sufficient antireflection effect may not be obtained, whereas if the addition amount exceeds 95% by weight, antiscratching property of a cured coated film of the curable resin composition may not be obtained.

Further, for the aforementioned reasons, the addition amount of the component (a) is more preferably 5 to 90% by weight, still more preferably 10 to 80% by weight.

The addition amount of the component (b) is not particularly limited, and it is usually 3 to 95% by weight. This is because if the addition amount is less than 3% by weight, antiscratching property of a cured coated film of the curable resin composition may not be obtained, whereas if the addition amount exceeds 95% by weight, refractive index of a cured coated film of the curable resin composition may increase, and thus sufficient antireflection effect may not be obtained.

Further, for the aforementioned reasons, the addition amount of the component (b) is more preferably 5 to 90% by weight, still more preferably 10 to 80% by weight.

(1) Polyfunctional (meth)acrylate Compound Containing at Least Two (meth)acryloyl Groups The polyfunctional (meth)acrylate compound containing at least two (meth)acryloyl groups is used to improve antiscratching property of a cured product obtained by curing the curable resin composition and an antireflection film using the same.

This compound is not particularly limited so long as it is a compound containing at least two (meth)acryloyl groups in the molecule. Examples thereof include a single kind of compound or combinations of two or more kinds of compounds selected from neopentyl glycol di(meth)acrylate, trimethylolpropane tri(meth)acrylate, pentaerythritol tri(meth)acrylate, trimethylolethane tri(meth)acrylate, pentaerythritol tetra(meth)acrylate, dipentaerythritol tetra(meth)acrylate, alkyl-modified dipentaerythritol tetra(meth)acrylate, dipentaerythritol penta(meth)acrylate, alkyl-modified dipentaerythritol penta(meth)acrylate, dipentaerythritol hexa(meth)acrylate, caprolactone-modified dipentaerythritol hexa(meth)acrylate, ditrimethylolpropane tetra(meth)acrylate, "U-15HA" (trade name, produced by Shin Nakamura Kagaku Co., Ltd.) and so forth.

Among these, neopentyl glycol di(meth)acrylate, dipentaerythritol hexa(meth)acrylate, pentaerythritol tetra(meth)acrylate, dipentaerythritol penta(meth)acrylate and caprolactone-modified dipentaerythritol hexa(meth)acrylate are particularly preferred.

(2) Fluorine-containing (meth)acrylate Compound Containing at Least One (meth)acryloyl Group The fluorine-containing (meth)acrylate compound containing at least one (meth)acryloyl group is used to decrease refractive index of the curable resin composition.

This compound is not particularly limited so long as it is a fluorine-containing (meth)acrylate compound containing at least one (meth)acryloyl group. Examples thereof include a single kind of compound or combinations of two or more kinds of compounds selected from perfluorooctylethyl (meth)acrylate, octafluoropentyl(meth)acrylate, trifluoroethyl(meth)acrylate and so forth.

(3) Compound Generating Active Species by Irradiation of Active Energy Ray or Heating The compound generating active species by irradiation of active energy ray or heating is used to cure the curable resin composition.

(i) Compound Generating Active Species by Irradiation of Active Energy Ray

Examples of the compound generating active species by irradiation of active energy ray (hereinafter referred to as "photopolymerization initiator") include photoradical generators generating a radical as an active species and so forth.

The active energy ray is defined as an energy ray which can generate an active species by decomposing a compound generating an active species. Examples of such an active energy ray include light energy rays such as visible lights, ultraviolet rays, infrared rays, X-rays, $\alpha$-rays, $\beta$-rays and $\gamma$-rays. However, an ultraviolet ray is preferably used in view of having a certain energy level and exhibiting high curing speed as well as requiring a relatively inexpensive and small-size irradiation apparatus.

① Type

Examples of the photoradical generator include acetophenone, acetophenone benzyl ketal, anthraquinone, 1-(4-isopropylphenyl)-2-hydroxy-2-methylpropan-1-one, carbazole, xanthone, 4-chlorobenzophenone, 4,4'-diaminobenzophenone, 1,1-dimethoxydeoxybenzoin, 3,3'-dimethyl-4-methoxybenzophenone, thioxanthone, 2,2-dimethoxy-2-phenylacetophenone, 1-(4-dodecylphenyl)-2-hydroxy-2-methylpropan-1-one, 2-methyl-1-[4-(methylthio)phenyl]-2-morpholinopropan-1-one, triphenylamine, 2,4,6-trimethylbenzoyldiphenylphosphine oxide, 1-hydroxycyclohexyl phenyl ketone, 2-hydroxy-2-methyl-1-phenylpropan-1-one, fluorenone, fluorene, benzaldehyde, benzoin ethyl ether, benzoin propyl ether, benzophenone, Michler's ketone, 3-methylacetophenone, 3,3',4,4'-tetra(tert-butylperoxycarbonyl)benzophenone (BTTB), 2-(dimethylamino)-1-[4-(morphonyl)phenyl]-2-phenylmethyl)-1-butanone, 4-benzoyl-4'-methyldiphenyl sulfide, benzil, combinations of BTTB with xanthene, thioxanthene, cumarin, ketocumarin or other pigment sensitizers and so forth.

Among these photopolymerization initiators, 2,2-dimethoxy-2-phenylacetophenone, 2-hydroxy-2-methyl-1-phenylpropan-1-one, 1-hydroxycyclohexyl phenyl ketone, 2,4,6-trimethylbenzoyldiphenylphosphine oxide, 2-methyl-1-[4-(methylthio)phenyl]-2-morpholinopropan-1-one, 2-(dimethylamino)-1-[4-(morphonyl)phenyl]-2-phenylmethyl)-1-butanone and so forth are preferred, and 1-hydroxycyclohexyl phenyl ketone, 2-methyl-1-[4-(methylthio)phenyl]-2-morpholinopropan-1-one, 2-(dimethylamino)-1-[4-(morphonyl)phenyl]-2-phenylmethyl)-1-butanone and so forth are more preferred.

② Addition Amount

Although the addition amount of the photopolymerization initiator is not particularly limited, it is preferably 0.01 to 20 parts by weight with regard to 100 parts by weight of the ethylenically unsaturated group-containing fluoropolymer. This is because if the addition amount is less than 0.01 parts by weight, the curing reaction may become insufficient, and thus antiscratching property and antiscratching property after immersion in an alkaline aqueous solution may be degraded, whereas if the addition amount of the photopolymerization initiator exceeds 20 parts by weight, refractive index of a cured product may increase, and thus antireflection effect may be degraded.

Further, for the aforementioned reasons, the addition amount of the photopolymerization initiator is more preferably 0.05 to 15 parts by weight, still more preferably 0.1 to 15 parts by weight, with regard to 100 parts by weight of the ethylenically unsaturated group-containing fluoropolymer.

(ii) Compound Generating Active Species by Heating

Examples of the compound generating active species by heating (hereinafter referred to as "thermal polymerization initiator") include thermal radical generators generating a radical as an active species and so forth.

① Type

Examples of the thermal radical generator include a single kind of compound or combinations of two or more kinds of compounds selected from benzoyl peroxide, tert-butyl-oxybenzoate, azobisisobutyronitrile, acetyl peroxide, lauryl peroxide, tert-butyl peracetate, cumyl peroxide, tert-butyl peroxide, tert-butyl hydroperoxide, 2,2'-azobis(2,4-dimethylvaleronitrile), 2,2'-azobis(4-methoxy-2,4-dimethylvaleronitrile) and so forth.

② Addition Amount

Although the addition amount of the thermal polymerization initiator is not particularly limited either, it is preferably 0.01 to 20 parts by weight with regard to 100 parts by weight of the ethylenically unsaturated group-containing fluoropolymer. This is because if the addition amount is less than 0.01 parts by weight, the curing reaction may become insufficient, and thus antiscratching property and antiscratching property after immersion in an alkaline aqueous solution may be degraded, whereas if the addition amount of the photopolymerization initiator exceeds 20 parts by weight, refractive index of a cured product may increase, and thus antireflection effect may be degraded.

Further, for the aforementioned reasons, the addition amount of the thermal polymerization initiator is more preferably 0.05 to 15 parts by weight, still more preferably 0.1 to 15 parts by weight, with regard to 100 parts by weight of the ethylenically unsaturated group-containing fluoropolymer.

(4) Organic Solvent

Further, an organic solvent is preferably added to the curable resin composition. By adding an organic solvent as described above, an antireflection film can be uniformly formed as a thin film. Examples of such an organic solvent include a single kind of solvent or combinations of two or more kinds of solvents selected from methyl isobutyl ketone (hereinafter also referred to as "MIBK"), methyl ethyl ketone, methanol, ethanol, t-butanol, isopropanol and so forth.

Although the addition amount of the organic solvent is not particularly limited either, it is preferably 100 to 100,000 parts by weight with regard to 100 parts by weight of the ethylenically unsaturated group-containing fluoropolymer. This is because if the addition amount is less than 100 parts by weight, it may become difficult to adjust viscosity of the curable resin composition, whereas if the addition amount exceeds 100,000 parts by weight, storage stability of the curable resin composition may be degraded, or viscosity may be unduly decreased so that handling may become difficult.

(5) Additives

So long as the object or effect of the present invention is not adversely affected, it is also preferred that the curable resin composition further contains additives such as radical photopolymerization initiators, photosensitizers, polymerization inhibitors, polymerization initiation aids, leveling agents, wettability improvers, surfactants, plasticizers, ultraviolet absorbers, antioxidants, antistatic agents, silane coupling agents, inorganic fillers, pigments and dyes.

(6) Preparation Method

The curable resin composition of the present invention can be prepared by adding the aforementioned ethylenically unsaturated group-containing fluoropolymer, the aforementioned component (a) and/or component (b), as well as the aforementioned component (c), organic solvent and additives as required and mixing them at room temperature or under a heating condition. Specifically, it can be prepared by using a blender such as a mixer, kneader, ball mill and three roll mill. When the mixing is performed under a heating condition, it is preferably performed at a temperature below the decomposition starting temperature of the thermal polymerization initiator.

(7) Curing Condition

The curing condition of the curable resin composition is not particularly limited either. However, when an active energy ray is used, for example, exposure is preferably 0.01 to 10 J/cm$^2$.

This is because if the exposure is less than 0.01 J/cm$^2$, curing defects may occur, whereas if the exposure exceeds 10 J/cm$^2$, the curing time may be unduly extended.

Further, for the aforementioned reasons, the exposure is more preferably 0.1 to 5 J/cm$^2$, still more preferably 0.3 to 3 J/cm$^2$.

Further, when the curable resin composition is cured by heating, it is preferably heated at a temperature in the range of 30 to 200° C. for 1 to 180 minutes. By heating the composition which such conditions, an antireflection film having superior antiscratching property can be more efficiently obtained without damaging a substrate and so forth.

Further, for the aforementioned reasons, the composition is more preferably heated at a temperature in the range of 50 to 180° C. for 2 to 120 minutes, still more preferably at a temperature in the range of 80 to 150° C. for 5 to 60 minutes.

3. Antireflection Film

Hereafter, the antireflection film of the present invention will be explained.

The antireflection film of the present invention contains a low refractive index layer comprising a cured product obtained by curing the aforementioned curable resin composition. Further, the antireflection film of the present invention can contain a high refractive index layer, a hard coat layer and a substrate under the low refractive index layer.

FIG. 1 shows such an antireflection film 10. As shown in FIG. 1, a hard coat layer 14, a high refractive index layer 16 and a low refractive index layer 18 are laminated on a substrate 12.

In the antireflection film, the high refractive index layer 16 may be formed directly on the substrate 12 without providing the hard coat layer 14.

Further, a medium intermediate refractive index layer (not shown) may be further provided between the high refractive index layer 16 and the low refractive index layer 18 or between the high refractive index layer 16 and the hard coat layer 14.

(1) Low Refractive Index Layer

The low refractive index layer is formed with a cured product obtained by curing the curable resin composition of the present invention. Since the configuration of the curable resin composition and the like are as described above, detailed explanations thereof are omitted in this section, and refractive index and thickness of the low refractive index layer will be explained hereafter.

(i) Refractive Index

Refractive index of a cured product obtained by curing the curable resin composition (refractive index for Na-D line, measurement temperature: 25° C.), that is, refractive index of the low refractive index film, is preferably 1.45 or lower. This is because if the refractive index of the low refractive index film exceeds 1.45, antireflection effect may be markedly degraded when it is used in combination with the high refractive index film.

Therefore, the refractive index of the low refractive index film is more preferably 1.44 or lower, still more preferably 1.43 or lower.

When two or more layers of the low refractive index film are provided, it is sufficient that at least one of these layers should have a refractive index value in the aforementioned range. That is, the other low refractive index film or films may have a value exceeding 1.45.

Further, when the low refractive index layer is provided, the refractive index thereof preferably differ from that of the high refractive index layer by 0.05 or more to provide more superior antireflection effect. This is because if the difference in the refractive index between the low refractive index layer and the high refractive index layer is less than 0.05, synergic effect of these antireflection film layers may not be obtained, and the antireflection effect may be degraded on the contrary.

Thus, the difference in the refractive index between the low refractive index layer and the high refractive index layer is more preferably 0.1 to 0.5, still more preferably 0.15 to 0.5.

(ii) Thickness

Further, although the thickness of the low refractive index layer is not particularly limited either, it is preferably, for example, 50 to 300 nm. This is because if the thickness of the low refractive index layer is less than 50 nm, adhesion to the high refractive index film as an undercoat may be degraded, whereas if the thickness exceeds 300 nm, optical interference may occur, which may result in degradation of antireflection effect.

Therefore, the thickness of the low refractive index layer is more preferably 50 to 250 nm, still more preferably 60 to 200 nm.

When a multilayer structure is formed with two or more low refractive index layers to obtain even better antireflection property, the total thickness may be 50 to 300 nm.

(2) High Refractive Index Layer

The curable composition for forming the high refractive index layer is not particularly limited, and preferred examples of film forming component include a single kind of component or combinations of two or more kinds of components selected from epoxy resins, phenolic resins, melamine resins, alkyd resins, cyanate resins, acrylic resins, polyester resins, urethane resins, siloxane resins and so forth. By using any of these resins, a strong thin film can be formed as the high refractive index layer, and as a result, antiscratching property of the antireflection film can be markedly improved.

However, the refractive index of these resins themselves is usually 1.45 to 1.62 and may be insufficient for obtaining high antireflection performance. Therefore, it is more preferable to add inorganic particles having a high refractive index, for example, metal oxide particles. Further, as for curing mechanism, although a curable composition that can be cured by heating, ultraviolet ray irradiation or electron beam irradiation can be used, it is more preferable to use an ultraviolet ray irradiation curable composition, which provides favorable productivity.

Although the thickness of the high refractive index layer is not particularly limited, it is preferably, for example, 50 to 30,000 nm. This is because if the thickness of the high refractive index layer is less than 50 nm, antireflection effect or adhesion to a substrate may be degraded when used in combination with the low refractive index layer, whereas if the thickness exceeds 30,000 nm, optical interference may occur, which may result in degradation of the antireflection effect on the contrary.

Therefore, the thickness of the high refractive index layer is more preferably 50 to 1,000 nm, still more preferably 60 to 500 nm.

Further, when a multilayer structure is formed with two or more of high refractive index layers to obtain even better antireflection property, the total thickness may be 50 to 30,000 nm.

When a hard coat layer is formed between the high refractive index layer and the substrate, the thickness of the high refractive index layer may be 50 to 300 nm.

(3) Hard Coat Layer

The material constituting the hard coat layer used for the antireflection film of the present invention is not particularly limited. Examples of the material include a single kind of material or combinations of two or more kinds of materials selected from siloxane resins, acrylic resins, melamine resins, epoxy resins and so forth.

Further, although the thickness of the hard coat layer is not particularly limited either, it is preferably 1 to 50 μm, more preferably 5 to 10 μm. This is because if the thickness of the hard coat layer is less than 1 μm, adhesion of the antireflection film to a substrate may not be improved, whereas if the thickness exceeds 50 μm, it may be difficult to uniformly form the hard coat layer.

(5) Substrate

Type of the substrate used for the antireflection film of the present invention is not particularly limited. Examples include substrates made of glass, polycarbonate resins, polyester resins, acrylic resins, triacetyl cellulose (TAC) resins and so forth. If the antireflection film contains any of these substrates, superior antireflection effect can be obtained in a wide range of fields in which antireflection films are used, such as a lens portion of camera, screen display portion of television (CRT) and color filter in a liquid crystal display device.

EXAMPLES

The present invention will be explained more specifically with reference to the following examples. However, the scope of the present invention is not limited to the descriptions of these examples.

Production Example 1

Synthesis of Hydroxyl Group-containing Fluoropolymer 1

Atmosphere in a stainless autoclave having an internal volume of 2.0 L and equipped with an electromagnetic stirrer was thoroughly replaced with nitrogen gas. Then, to the autoclave, 400 g of ethyl acetate, 53.2 g of perfluoro (propyl vinyl ether) (FPVE), 36.1 g of ethyl vinyl ether (EVE), 44.0 g of hydroxyethyl vinyl ether (HEVE), 1.00 g of lauroyl peroxide, 6.0 g of azo group-containing polydimethylsiloxane represented by the aforementioned general formula (8) (trade name: VPS1001, produced by Wako Pure Chemical Industries) and 20.0 g of a nonionic reactive emulsifier (trade name: NE-30, produced by Asahi Denka Co., Ltd.) were charged, and after the mixture was cooled with dry ice/methanol to −50° C., oxygen in the system was purged with nitrogen gas again.

Then, 120.0 g of hexafluoropropylene (HFP) was charged, and the temperature rise was started. The pressure in the autoclave was $5.3 \times 10^5$ Pa when the temperature in the autoclave reached 60° C. Then, the reaction was continued with stirring at 70° C. for 20 hours, and when the pressure decreased to $1.7 \times 10^5$ Pa, the autoclave was cooled with water to terminate the reaction.

After the temperature of the mixture reached room temperature, the unreacted monomers were discharged, and the autoclave was opened to obtain a polymer solution having a solid concentration of 26.4%. The resulting polymer solution was poured into methanol to precipitate the polymer, and the polymer was washed with methanol and dried at 50° C. under vacuum to obtain 220 g of hydroxyl group-containing fluoropolymer. This was designated a hydroxyl group-containing fluoropolymer 1. The used monomers and solvents are shown in Table 1.

Number average molecular weight in terms of polystyrene and fluorine content of the obtained hydroxyl group-containing fluoropolymer 1 were measured by GPC and the alizarin complexone method, respectively. Further, proportions of monomer components constituting the hydroxyl group-containing fluoropolymer 1 were determined from the results of $^1$H-NMR and $^{13}$C-NMR, elementary analysis and the fluorine content. The results are shown in Table 2.

VPS1001 is an azo group-containing polydimethylsiloxane represented by the aforementioned general formula (8) and having a number average molecular weight of 70,000 to 90,000 and a molecular weight of the polysiloxane moiety of about 10,000. NE-30 is a nonionic reactive emulsifier represented by the aforementioned general formula (10), wherein n is 9, m is 1, and u is 30.

Further, relationships between the monomers shown in Table 2 and the structural units are as follows.

| Monomer | Structural unit |
|---|---|
| Hexafluoropropylene | (a) |
| Perfluoro(propyl vinyl ether) | (a) |
| Ethyl vinyl ether | (b) |
| Hydroxyethyl vinyl ether | (c) |
| NE-30 | (f) |
| Polydimethylsiloxane base structure | (d) |

TABLE 1

| | Monomer and solvent | Hydroxyl group-containing fluoropolymer 1 | Hydroxyl group-containing fluoropolymer 2 | Hydroxyl group-containing fluoropolymer 3 | Hydroxyl group-containing fluoropolymer 4 | Hydroxyl group-containing fluoropolymer 5 |
|---|---|---|---|---|---|---|
| Charged amount (g) | Hexafluoropropylene | 120.0 | 120.0 | 100.0 | 100.0 | 100.0 |
| | Perfluoro (propyl vinyl ether) | 53.2 | 53.2 | 76.3 | 76.3 | 76.3 |
| | Ethyl vinyl ether | 36.1 | 64.9 | 48.2 | 48.2 | 48.2 |
| | Hydroxyethyl vinyl ether | 44.0 | 8.8 | 25.2 | 25.2 | 25.2 |
| | Lauroyl peroxide | 1.0 | 1.0 | 1.0 | 1.0 | 1.0 |
| | VPS1001 | 6.0 | 6.0 | 6.0 | 0.0 | 6.0 |
| | NE-30 | 20.0 | 20.0 | 20.0 | 20.0 | 0.0 |
| | Ethyl acetate | 400.0 | 400.0 | 400.0 | 400.0 | 400.0 |

TABLE 2

| | Monomer | Hydroxyl group-containing fluoropolymer 1 | Hydroxyl group-containing fluoropolymer 2 | Hydroxyl group-containing fluoropolymer 3 | Hydroxyl group-containing fluoropolymer 4 | Hydroxyl group-containing fluoropolymer 5 |
|---|---|---|---|---|---|---|
| Monomer composition (mole %) | Hexafluoropropylene | 41.1 | 41.1 | 33.8 | 34.8 | 33.9 |
| | Perfluoro (propyl vinyl ether) | 10.0 | 10.0 | 14.2 | 14.9 | 14.4 |
| | Ethyl vinyl ether | 20.9 | 40.6 | 33.2 | 34.9 | 33.5 |
| | Hydroxyethyl vinyl ether | 24.8 | 5.1 | 14.4 | 14.6 | 14.5 |
| | NE-30 | 0.8 | 0.8 | 0.8 | 0.8 | 0.0 |
| Polydimethylsiloxane base structure (mole %) | | 2.4 | 2.4 | 3.6 | 0.0 | 3.7 |
| Number average molecular weight | | 34,000 | 35,000 | 32,000 | 31,000 | 34,000 |

Production Example 2

Synthesis of Hydroxyl Group-containing Fluoropolymer 2

A hydroxyl group-containing fluoropolymer was synthesized in the same manner as in Production Example 1 except that the amounts of ethyl vinyl ether and hydroxyethyl vinyl ether used were changed as shown in Table 1. This was designated a hydroxyl group-containing fluoropolymer 2. Proportions of the monomer components are shown in Table 2.

Production Example 3

Synthesis of Hydroxyl Group-containing Fluoropolymer 3

A hydroxyl group-containing fluoropolymer was synthesized in the same manner as in Production Example 1 except that the amounts of hexafluoropropylene, perfluoro(propyl vinyl ether), ethyl vinyl ether and hydroxyethyl vinyl ether used were changed as shown in Table 1. This was designated a hydroxyl group-containing fluoropolymer 3. Proportions of the monomer components are shown in Table 2.

Production Example 4

Synthesis of Hydroxyl Group-containing Fluoropolymer 4

A hydroxyl group-containing fluoropolymer was synthesized in the same manner as in Production Example 3 except that VPS1001 was not used. This was designated a hydroxyl group-containing fluoropolymer 4. Proportions of the monomer components are shown in Table 2.

Production Example 5

Synthesis of Hydroxyl Group-containing fluoropolymer 5

A hydroxyl group-containing fluoropolymer was synthesized in the same manner as in Production Example 3 except that NE-30 was not used. This was designated a hydroxyl group-containing fluoropolymer 5. Proportions of the monomer components are shown in Table 2.

Production Example 6

Preparation of Zirconia-containing Composition for Hard Coat Layer

In dry air, to a solution comprising 7.8 parts of mercaptopropyltrimethoxysilane and 0.2 part of dibutyltin dilaurate, 20.6 parts of isophorone diisocyanate was added dropwise with stirring at 50° C. for one hour, and then the mixture was stirred at 60° C. for 3 hours. To the reaction mixture, 71.4 parts of pentaerythritol triacrylate was added dropwise at 30° C. for one hour, and then the mixture was stirred with heating at 60° C. for 3 hours to obtain an organic compound (S1).

Then, a mixture of 8.2 parts of the synthesized organic compound (S1), 91.8 parts of toluene zirconia sol (number average particle diameter: 0.01 μm, zirconia concentration: 30%), 41.2 parts of methyl ethyl ketone and 0.1 part of ion exchanged water was stirred at 60° C. for 4 hours, then 1.3 parts of orthoformic acid methyl ester was added to the mixture, and the mixture was further stirred with heating at the same temperature for one hour to obtain a crosslinkable particle dispersion (dispersion a). In an amount of 2 g of this dispersion was weighed on an aluminum plate, dried on a hot plate at 120° C. for one hour and weighed to determine the solid content. As a result, it was found to be 25%.

In a vessel shielded from ultraviolet rays, 312 parts of the produced dispersion a, 12.0 parts of dipentaerythritol hexaacrylate, 9.0 parts of pentaerythritol triacrylate and 1.0 part of 2-methyl-1-[4-(methylthio)phenyl]-2-morpholino-propan-1-one were stirred at 50° C. for 2 hours under dry air flow to obtain a composition for hard coat layer as a uniform solution. In an amount of 2 g of this composition was weighed on an aluminum plate, dried on a hot plate at 120° C. for one hour and weighed to determine the solid content. As a result, it was found to be 30%.

Production Example 7

Preparation of Substrate for Coating with Curable Resin Composition

A surface subjected to an easy adhesion treatment of a single-sided easy adhesive polyethylene terephthalate (PET) film A4100 (film thickness: 188 μm, produced by Toyobo Co., Ltd.) was coated with the zirconia-containing composition for hard coat layer prepared in Production Example 6 by using a wire bar coater (#7), and the coated layer was dried in an oven at 80° C. for one minute to form a coated film. Then, in the air, the film was irradiated with an ultraviolet ray by using a high pressure mercury lamp with a light irradiation condition of 0.9 mJ/cm$^2$ to prepare a substrate for coating with curable resin composition. The film thickness of the hard coat layer on the substrate was measured by using a stylus surface profiler and found to be 3 μm.

Hereafter, synthesis examples of the ethylenically unsaturated group-containing fluoropolymers of the present invention will be explained in Examples 1 to 7 and Comparative Examples 1 to 3.

Example 1

Synthesis of Ethylenically Unsaturated Group-containing Fluoropolymer (A-1)

To a 1 L-volume separable flask equipped with an electromagnetic stirrer, glass cooling pipe and thermometer, 50.0 g of the hydroxyl group-containing fluoropolymer 1 obtained in Production Example 1, 0.01 g of 2,6-di-t-butylmethylphenol as a polymerization inhibitor and 370 g of MIBK were charged and stirred at 20° C. until the hydroxyl group-containing fluoropolymer 1 was dissolved in MIBK so that the solution should become transparent and uniform.

Then, to this system, 15.1 g of 2-methacryloyloxyethyl isocyanate was added, and the mixture was stirred until it became a uniform solution. Then, 0.1 g of dibutyltin dilaurate was added to the solution to initiate the reaction, and the mixture was continuously stirred for 5 hours while the temperature of the system was maintained at 55 to 65° C. to obtain a solution of ethylenically unsaturated group-containing fluoropolymer (A-1) in MIBK. In an amount of 2 g of this solution was weighed on an aluminum plate, dried on a hot plate at 150° C. for 5 minutes and weighed to measure the solid content. As a result, it was found to be 15.2%. The used compounds, solvent and solid content are shown in Table 3.

TABLE 3

| Examples and Comparative Examples | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Ethylenically unsaturated group-containing fluoropolymer | A-1 | A-2 | A-3 | A-4 | A-5 | A-6 | A-7 | A-8 | A-9 | A-10 |
| Hydroxyl group-containing fluoropolymer 1 (g) | 50.0 | 50.0 | 50.0 | | | | | 50.0 | 50.0 | 50.0 |
| Hydroxyl group-containing fluoropolymer 2 (g) | | | | 50.0 | | | | | | |
| Hydroxyl group-containing fluoropolymer 3 (g) | | | | | 50.0 | | | | | |
| Hydroxyl group-containing fluoropolymer 4 (g) | | | | | | 50.0 | | | | |
| Hydroxyl group-containing fluoropolymer 5 (g) | | | | | | | 50.0 | | | |
| 2-Methacryloyloxyethyl isocyanate (g) | 15.1 | 16.4 | 20.6 | 3.5 | 9.5 | 9.5 | 10.5 | 6.9 | 13.7 | 27.4 |
| 2,6-Di-t-butylmethyl-phenol (g) | 0.01 | 0.01 | 0.01 | 0.01 | 0.01 | 0.01 | 0.01 | 0.01 | 0.01 | 0.01 |
| Dibutyltin dilaurate (g) | 0.1 | 0.1 | 0.1 | 0.1 | 0.1 | 0.1 | 0.1 | 0.1 | 0.1 | 0.1 |
| Methyl isobutyl ketone (g) | 370 | 377 | 400 | 304 | 338 | 338 | 343 | 323 | 362 | 439 |
| Charged amount of 2-methacryloyloxyethyl isocyanate based on hydroxyl group content of hydroxyl group-containing fluoropolymer (molar ratio) | 1.1 | 1.2 | 1.5 | 1.2 | 1.2 | 1.2 | 1.2 | 0.5 | 1.0 | 2.0 |
| Solid concentration (% by weight) | 15.2 | 15.1 | 15.2 | 15.3 | 15.1 | 15.1 | 15.2 | 15.2 | 15.2 | 15.2 |

Examples 2 to 7

Synthesis of Ethylenically Unsaturated Group-containing Fluoropolymers (A-2 to A-7)

Solutions of ethylenically unsaturated group-containing fluoropolymers (A-2 to A-7) in MIBK were obtained in the same manner as in Example 1 except that the type of hydroxyl group-containing fluoropolymer, amounts of 2-methacryloyloxyethyl isocyanate and MIBK and molar ratio of isocyanate group to hydroxyl group used in Example 1 were changed as shown in Table 3.

Comparative Examples 1 to 3

Synthesis of Ethylenically Unsaturated Group-containing Fluoropolymers (A-8 to A-10)

Ethylenically unsaturated group-containing fluoropolymers (A-8 to A-10) were obtained in the same manner as in Example 1 except that the amounts of 2-methacryloyloxyethyl isocyanate and MIBK and molar ratio of isocyanate group to hydroxyl group used in Example 1 were changed as shown in Table 3.

The ethylenically unsaturated group-containing fluoropolymers (A-8 and A-9) do not fall within the scope of the present invention because the molar ratio of isocyanate group to hydroxyl group at the time of the synthesis is less than 1.1. Further, the ethylenically unsaturated group-containing fluoropolymer (A-10) does not fall within the scope of the present invention because the molar ratio of isocyanate group to hydroxyl group at the time of the synthesis exceeds 1.9.

Hereafter, preparation examples of the curable resin composition of the present invention will be explained as Examples 8 to 16 and Comparative Examples 4 to 6.

Example 8

As shown in Table 4, 68 g of the ethylenically unsaturated group-containing fluoropolymer (A-1) synthesized in Example 1, 30 g of neopentyl glycol diacrylate (trade name: NK Ester A-NPG, produced by Shin-Nakamura Chemical Co., Ltd.) as the polyfunctional (meth)acrylate compound containing at least two (meth)acryloyl groups (hereinafter referred to as the "polyfunctional (meth)acrylate compound"), 2 g of 2-methyl-1-[4-(methylthio)phenyl]-2-morpholinopropan-1-one (trade name: IRGACURE 907, produced by Ciba Specialty Chemicals) as a photopolymerization initiator, 960 g of MIBK and 1440 g of tert-butyl alcohol were charged in a separable glass flask equipped with a stirrer and stirred at 23° C. for one hour to obtain a uniform curable resin composition (B-1). Further, the solid content was measured in the same manner as in Example 1.

TABLE 4

| Example and Comparative Examples | Example 8 | Example 9 | Example 10 | Example 11 | Example 12 | Example 13 | Example 14 |
|---|---|---|---|---|---|---|---|
| Curable resin composition | B-1 | B-2 | B-3 | B-4 | B-5 | B-6 | B-7 |
| Ethylenically unsaturated group-containing fluoropolymer (g) | | | | | | | |
| A-1 | 68 | | | | | | |
| A-2 | | 68 | | 68 | 18 | | |
| A-3 | | | 68 | | | | |
| A-4 | | | | | | 73 | |
| A-5 | | | | | | | 68 |
| A-6 | | | | | | | |
| A-7 | | | | | | | |
| A-8 | | | | | | | |
| A-9 | | | | | | | |
| A-10 | | | | | | | |
| Polyfunctional (meth)acrylate (g) | | | | | | | |
| Neopentyl glycol diacrylate | 30 | 30 | 30 | | | | 30 |
| dipentaerythritol pentaacrylate | | | | | | 30 | 25 |
| Fluorine-containing (meth)acrylate (g) | | | | | | | |
| Bifunctional fluorine acrylate | | | | 30 | 50 | | |
| Photopolymerization initiator (g) | | | | | | | |
| IRGACURE 907 | 2 | 2 | 2 | 2 | 2 | 2 | 2 |
| Solvent (g) | | | | | | | |
| Methyl isobutyl ketone | 960 | 960 | 960 | 960 | 960 | 960 | 960 |
| tert-Butyl alcohol | 1,440 | 1,440 | 1,440 | 1,440 | 1,440 | 1,440 | 1,440 |
| Solid concentration (% by weight) | 4 | 4 | 4 | 4 | 4 | 4 | 4 |
| Characteristics of cured product | | | | | | | |
| Refractive index | 1.44 | 1.44 | 1.44 | 1.40 | 1.40 | 1.42 | 1.43 |
| Antiscratching property | ⊙ | ⊙ | ⊙ | ⊙ | ⊙ | ⊙ | ⊙ |
| Antiscratching property after storage in humid and hot environment | ○ | ⊙ | ○ | ⊙ | ⊙ | ⊙ | ⊙ |
| Antiscratching property after immersion in alkaline aqueous solution | ○ | ⊙ | ○ | ⊙ | ⊙ | ⊙ | ⊙ |
| Coating property | ⊙ | ⊙ | ⊙ | ⊙ | ⊙ | ⊙ | ⊙ |

| Example and Comparative Examples | Example 15 | Example 16 | Comparative example 4 | Comparative example 5 | Comparative example 6 |
|---|---|---|---|---|---|
| Curable resin composition | B-8 | B-9 | C-1 | C-2 | C-2 |
| Ethylenically unsaturated group-containing fluoropolymer (g) | | | | | |
| A-1 | | | | | |
| A-2 | | | | | |
| A-3 | | | | | |
| A-4 | | | | | |
| A-5 | | | | | |
| A-6 | 68 | | | | |
| A-7 | | 68 | | | |
| A-8 | | | 68 | | |
| A-9 | | | | 68 | |
| A-10 | | | | | 68 |
| Polyfunctional (meth)acrylate (g) | | | | | |
| Neopentyl glycol diacrylate | 30 | 30 | 30 | 30 | 30 |
| dipentaerythritol pentaacrylate | | | | | |
| Fluorine-containing (meth)acrylate (g) | | | | | |

TABLE 4-continued

| | | | | | |
|---|---|---|---|---|---|
| Bifunctional fluorine acrylate | | | | | |
| Photopolymerization initiator (g) | | | | | |
| IRGACURE 907 | 2 | 2 | 2 | 2 | 2 |
| Solvent (g) | | | | | |
| Methyl isobutyl ketone | 960 | 960 | 960 | 960 | 960 |
| tert-Butyl alcohol | 1,440 | 1,440 | 1,440 | 1,440 | 1,440 |
| Solid concentration (% by weight) | 4 | 4 | 4 | 4 | 4 |
| Characteristics of cured product | | | | | |
| Refractive index | 1.43 | 1.43 | 1.43 | 1.44 | 1.45 |
| Antiscratching property | ○ | ⊙ | ○ | ⊙ | ○ |
| Antiscratching property after storage in humid and hot environment | ○ | ⊙ | X | Δ | Δ |
| Antiscratching property after immersion in alkaline aqueous solution | ○ | ⊙ | X | X | X |
| Coating property | ⊙ | ○ | ⊙ | ⊙ | ○ |

Example 9

A curable resin composition (B-2) was obtained in the same manner as in Example 8 except that the ethylenically unsaturated group-containing fluoropolymer (A-2) synthesized in Example 2 was used instead of the ethylenically unsaturated group-containing fluoropolymer (A-1) as shown in Table 4.

Example 10

A curable resin composition (B-3) was obtained in the same manner as in Example 8 except that the ethylenically unsaturated group-containing fluoropolymer (A-3) synthesized in Example 3 was used instead of the ethylenically unsaturated group-containing fluoropolymer (A-1) as shown in Table 4.

Example 11

A curable resin composition (B-4) was obtained in the same manner as in Example 9 except that a bifunctional fluorine-containing acrylate represented by the following formula (11) as the fluorine-containing (meth)acrylate compound containing at least one (meth)acryloyl group (hereinafter referred to as the "fluorine-containing (meth)acrylate compound") was used instead of the polyfunctional (meth) acrylate compound as shown in Table 4.

Example 12

A curable resin composition (B-5) was obtained in the same manner as in Example 11 except that amounts of the ethylenically unsaturated group-containing fluoropolymer (A-2) and the bifunctional fluorine-containing acrylate were changed to 18 g and 50 g, respectively, and 30 g of dipentaerythritol pentaacrylate (SR399E, produced by Nippon Kayaku Co., Ltd.) was further used as a polyfunctional (meth)acrylate compound as shown in Table 4.

Example 13

A curable resin composition (B-6) was obtained in the same manner as in Example 8 except that 73 g of the ethylenically unsaturated group-containing fluoropolymer (A-4) synthesized in Example 4 was used instead of the ethylenically unsaturated group-containing fluoropolymer (A-1) and 25 g of dipentaerythritol pentaacrylate was used as a polyfunctional (meth)acrylate compound as shown in Table 4.

Example 14

A curable resin composition (B-7) was obtained in the same manner as in Example 8 except that the ethylenically unsaturated group-containing fluoropolymer (A-5) synthesized in Example 5 was used instead of the ethylenically unsaturated group-containing fluoropolymer (A-1) as shown in Table 4.

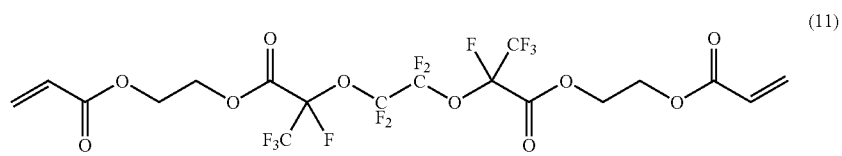

(11)

Example 15

A curable resin composition (B-8) was obtained in the same manner as in Example 8 except that the ethylenically unsaturated group-containing fluoropolymer (A-6) synthesized in Example 6 was used instead of the ethylenically unsaturated group-containing fluoropolymer (A-1) as shown in Table 4.

Example 16

A curable resin composition (B-9) was obtained in the same manner as in Example 8 except that the ethylenically unsaturated group-containing fluoropolymer (A-7) synthesized in Example 7 was used instead of the ethylenically unsaturated group-containing fluoropolymer (A-1) as shown in Table 4.

Comparative Example 4

A curable resin composition (C-1) was obtained in the same manner as in Example 8 except that the ethylenically unsaturated group-containing fluoropolymer (A-8) synthesized in Comparative Example 1 was used instead of the ethylenically unsaturated group-containing fluoropolymer (A-1) as shown in Table 4.

Comparative Example 5

A curable resin composition (C-2) was obtained in the same manner as in Example 8 except that the ethylenically unsaturated group-containing fluoropolymer (A-9) synthesized in Comparative Example 2 was used instead of the ethylenically unsaturated group-containing fluoropolymer (A-1) as shown in Table 4.

Comparative Example 6

A curable resin composition (C-3) was obtained in the same manner as in Example 8 except that the ethylenically unsaturated group-containing fluoropolymer (A-10) synthesized in Comparative Example 2 was used instead of the ethylenically unsaturated group-containing fluoropolymer (A-1) as shown in Table 4.

Test Example

Refractive index, antiscratching property and coating property of cured products obtained by curing the curable resin compositions of Examples 8 to 16 and Comparative Examples 4 to 6 were determined by the following measurement methods.

(1) Refractive Index

Each curable resin composition was applied on a silicon wafer by using a spin coater to obtain a thickness of about 0.1 μm after drying and then cured by irradiation with an ultraviolet ray under a light irradiation condition of 0.5 mJ/cm$^2$ using a high pressure mercury lamp under nitrogen. The refractive index ($^nD_{25}$) of the obtained cured product was measured at a wavelength of 539 nm at 25° C. by using an ellipsometer. The results are shown in Table 4.

(2) Antiscratching Property

Each curable resin composition was applied on the substrate for coating with curable resin composition prepared in Production Example 7 by using a wire bar coater (#3) and dried in an oven at 80° C. for one minute to form a coated film. Then, the coated film was irradiated with an ultraviolet ray under a light irradiation condition of 0.5 mJ/cm$^2$ by using a high pressure mercury lamp under nitrogen to prepare an evaluation sample. The film thickness of this cured product layer was estimated by measuring reflectance and found to be about 100 nm.

The surface of the prepared evaluation sample was manually rubbed 200 times in a reciprocal manner with cellulose non-woven fabric (trade name: BEMCOT, produced by Asahi Kasei Corporation) impregnated with ethanol, and antiscratching property of the surface of the evaluation sample was evaluated by visual inspection according to the following criteria. The results are shown in Table 4.

◎: No scratch is observed on the surface of the evaluation sample.

◯: Fine scratches are present on the surface of the evaluation sample.

Δ: Scratches are present on the surface of the evaluation sample.

X: Delamination of the coated film is observed.

(3) Antiscratching Property after Storage in Humid and Hot Environment

The aforementioned evaluation sample was left standing under the conditions of 80° C. and 95% RH for one week, and then the surface thereof was manually rubbed 200 times in a reciprocal manner with cellulose non-woven fabric (trade name: BEMCOT, produced by Asahi Kasei Corporation) impregnated with ethanol, and durability of the surface of the evaluation sample was evaluated by visual inspection according to the following criteria. The results are shown in Table 4.

◎: No scratch is observed on the surface of the evaluation sample.

◯: Fine scratches are present on the surface of the evaluation sample.

Δ: Scratches are present on the surface of the evaluation sample.

X: Delamination of the coated film is observed.

(4) Antiscratching Property after Immersion in Alkaline Aqueous Solution

The aforementioned evaluation sample was immersed in a 2 N sodium hydroxide aqueous solution at 25° C. for 2 minutes, washed with distilled water and air-dried. Then, the surface thereof was manually rubbed 200 times in a reciprocal manner with cellulose non-woven fabric (trade name: BEMCOT, produced by Asahi Kasei Corporation) impregnated with ethanol, and antiscratching property after immersion in an alkaline aqueous solution of the surface of the evaluation sample was evaluated by visual inspection according to the following criteria. The results are shown in Table 4.

◎: No scratch is observed on the surface of the evaluation sample.

◯: Fine scratches are present on the surface of the evaluation sample.

Δ: Scratches are present on the surface of the evaluation sample.

X: Delamination of the coated film is observed.

(5) Coating Property

Each curable resin composition was applied on the substrate for coating with curable resin composition prepared in Production Example 7 by using a wire bar coater (#3) and dried in an oven at 80° C. for one minute to form a coated film. Subsequently, the coated film was irradiated with an ultraviolet ray by using a high pressure mercury lamp under a light irradiation condition of 0.5 mJ/cm² under nitrogen to prepare an evaluation sample. The surface property of the obtained coated film was evaluated by visual inspection according to the following four-level criteria (⊚, ○, Δ, X). The results are shown in Table 4.

⊚: A uniform coated film is obtained with no defect over the whole coated film.

○: A substantially uniform coated film is obtained with defects in a part of coated film.

Δ: Unevenness of coated film is observed with defects in a part of coated film.

X: Defects are observed over the whole coated film surface.

INDUSTRIAL APPLICABILITY

With the ethylenically unsaturated group-containing fluoropolymer of the present invention, as well as the curable resin composition and the antireflection film using the same, superior antiscratching property, coating property and durability can be obtained.

The invention claimed is:

1. An ethylenically unsaturated group-containing fluoropolymer, which is obtained by reacting
   a compound containing one isocyanate group and at least one ethylenically unsaturated group, and
   a hydroxyl group-containing fluoropolymer
   at an isocyanate group/hydroxyl group molar ratio of 1.1 to 1.9,
   wherein the hydroxyl group containing fluoropolymer contains 20 to 70% by mole of the following structural unit (a), 10 to 70% by mole of the following structural unit (b), 5 to 70% by mole of the following structural unit (c) and 0.1 to 10% by mole of the following structural unit (d) and
   has a number average molecular weight of 5,000 to 500,000 in terms of polystyrene as measured by gel permeation chromatography:
   (a) a structural unit represents by general formula (1);
   (b) a structural unit represents by general formula (2);
   (c) a structural unit represents by general formula (3);
   (d) a structural unit derived from an azo group-containing polysiloxane compound and represented by the following general formula (4);

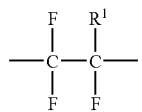
(1)

wherein, in the general formula (1), $R^1$ represents a fluorine atom, fluoroalkyl group or group represented as —$OR^2$ ($R^2$ represents an alkyl group or fluoroalkyl group);

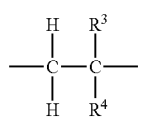
(2)

wherein, in the general formula (2), $R^3$ represents a hydrogen atom or methyl group, $R^4$ represents an alkyl group, group represented as —$(CH_2)_x$—$OR^5$ or —$OCOR^5$ ($R^5$ represents an alkyl group or glycidyl group, and x represents a number of 0 or 1), carboxyl group or alkoxycarbonyl group;

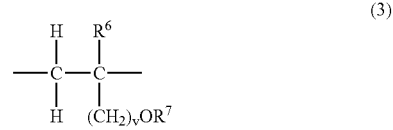
(3)

wherein, in the general formula (3), $R^6$ represents a hydrogen atom or methyl group, $R^7$ represents a hydrogen atom or hydroxyalkyl group, and v represents a number of 0 or 1;

(4)

wherein, in the general formula (4), $R^8$ and $R^9$ may be identical or different and represent a hydrogen atom, alkyl group, halogenated alkyl group or aryl group.

2. The ethylenically unsaturated group-containing fluoropolymer according to claim 1, which contains the structural unit (d) as a part of the following structural unit (e):
   (e) a structural unit represented by the following general formula (5):

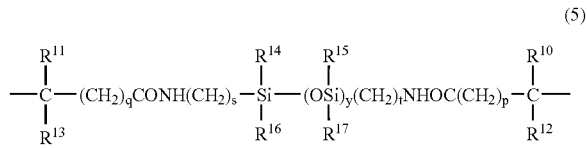
(5)

wherein, in the general formula (5), $R^{10}$ to $R^{13}$ represent a hydrogen atom, alkyl group or cyano group, $R^{14}$ to $R^{17}$ represent a hydrogen atom or alkyl group, p and q represent a number of 1 to 6, s and t represent a number of 0 to 6, and y represents a number of 1 to 200.

3. The ethylenically unsaturated group-containing fluoropolymer according to claim 1, which further contains 0.1 to 5% by mole of the following structural unit (f):
   (f) a structural unit represented by the following general formula (6):

(6)

wherein, in the general formula (6), $R^{18}$ represents a group having emulsifying action.

4. The ethylenically unsaturated group-containing fluoropolymer according to claim 1, wherein the compound containing one isocyanate group and at least one ethylenically unsaturated group is 2-(meth)acryloyloxyethyl isocyanate.

5. The ethylenically unsaturated group-containing fluoropolymer according to claim 1, wherein the number average molecular weight in terms of polystyrene is 10,000 to 300,000.

6. The ethylenically unsaturated group-containing fluoropolymer according to claim 1, wherein the number average molecular weight in terms of polystyrene is 10,000 to 100,000.

7. The ethylenically unsaturated group-containing fluoropolymer according to claim 1, wherein the isocyanate group/hydroxyl group molar ratio is 1.1 to 1.5.

8. The ethylenically unsaturated group-containing fluoropolymer according to claim 1, wherein the isocyanate group/hydroxyl group molar ratio is 1.2 to 1.5.

* * * * *